United States Patent Office 3,729,375
Patented Apr. 24, 1973

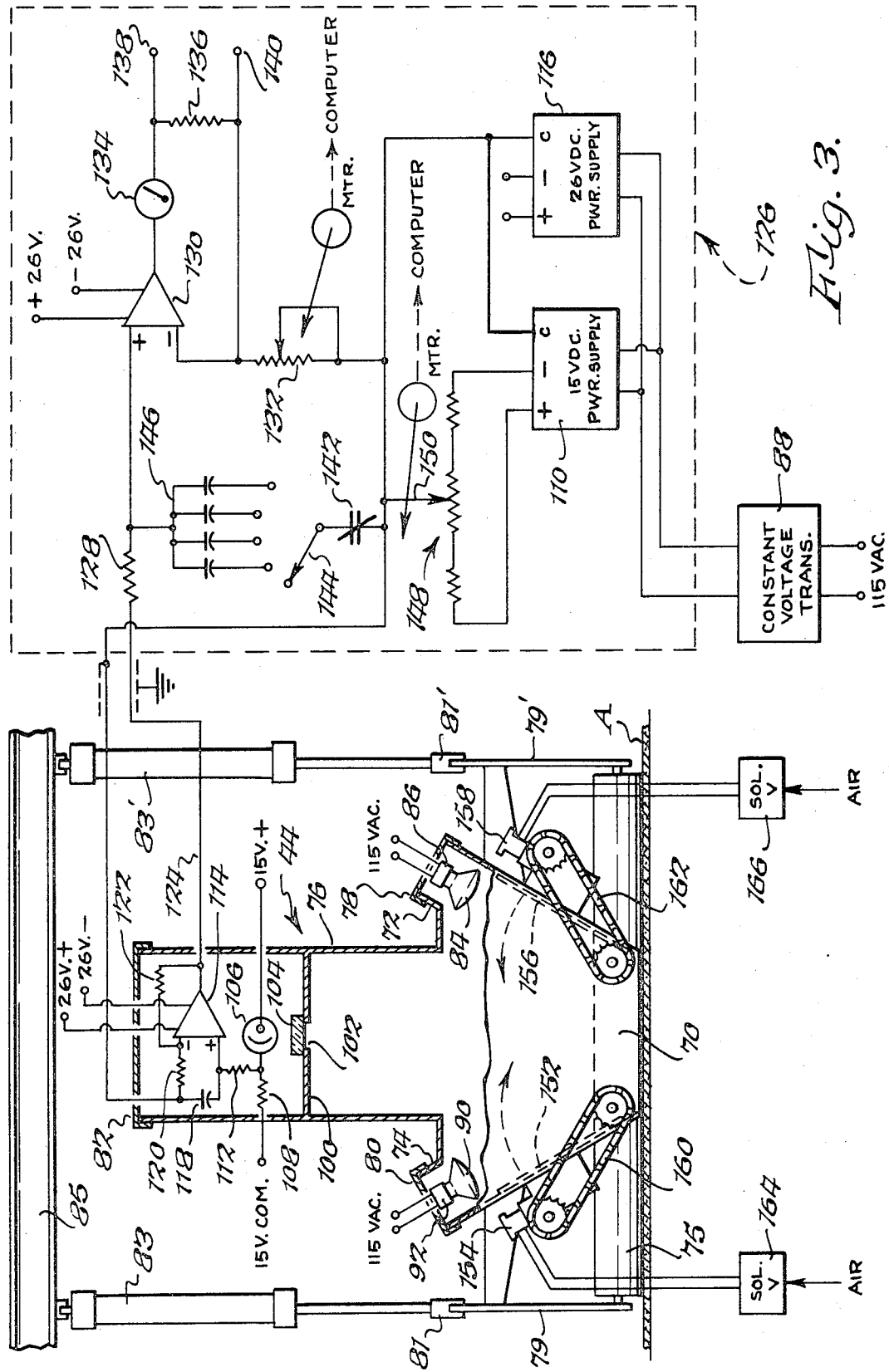

3,729,375
METER FOR MEASURING BRIGHTNESS OF BLEACHED FIBERS AND CONTROLLING THE BLEACHING PROCESS
James H. Chappelle, Mobile, Ala., assignor to International Paper Company, New York, N.Y.
Continuation-in-part of application Ser. No. 31,857, May 1, 1970, now Patent No. 3,607,623, which is a continuation of application Ser. No. 535,402, Mar. 18, 1966, now abandoned. This application July 29, 1971, Ser. No. 167,407
Int. Cl. D21c 7/12; G01n 21/30, 21/48
U.S. Cl. 162—252                9 Claims

ABSTRACT OF THE DISCLOSURE

Apparatus for continuously controlling the bleaching of fibers and for continuously measuring and recording the brightness of light reflected from the bleached fibers comprising a bleaching tank, pipe lines for feeding fibers to and from the tank, drums for forming the fibers leaving and entering the tank into mats on the drums, and a first and a second photoelectric measuring apparatus supported by rollers on the fiber mats on the first and second drums, respectively, for producing first and second control signals representative of the separate brightnesses of the fiber mats. Motor controlled valves responsive to the first control signal regulate the flow of bleaching agent into the tank as well as the temperature of the fibers entering the tank. A computerized controller compares the value of the second control signal, representative of the brightness of fibers leaving the tank, with a predetermined standard value and modifies the response of the motor controlled valves to the first contol signal in accordance with changes in the comparative value. Two reflectance standardization plates are mounted in at least one of the photoelectric measuring devices for calibrating the device over the range of brightness values which it must measure.

CROSS-REFERENCE TO RELATED APPLICATION

This application is a continuation-in-part of copending application Ser. No. 31,857, filed May 1, 1970 by James H. Chappelle, now Pat. 3,607,623, which application is a continuation application of Ser. No. 535,402, filed Mar. 18, 1966 by James H. Chappelle, now abandoned.

BACKGROUND OF THE INVENTION

This invention relates to color measurement and control and more particularly to color measurement and control of pulp stock in papermaking.

In the manufacture of paper, particularly kraft, it is the usual practice to bleach the fibers before forming the fibers in the sheet. This is accomplished by chemically treating, and washing, the fibers. For obvious reasons, it is desirable, after treatment, that the fibers be substantially of standard and uniform color. To attain such a standard and uniform color, it is the usual practice to vary the chemical treatment, as needed, to suit the needs of the fibers.

To an appreciable extent, fiber bleaching, heretofore, has been controlled by an operator who, by visual observation of the bleached fibers and manual adjustment, increased or decreased the chemicals added to the system. Periodically, a handful of the bleached and washed fibers is withdrawn from the system, repulped with clean water, hand sheeted and dried. The color of the repulped, hand sheeted and dried sample is then measured and compared with a known stanard. Such sampling, repulping, hand sheeting, drying and measuring takes a substantial amount of time and tests only a very small sample which may not be representative of the fibers in the system. In addition, if the fibers are not properly sheeted, or the sheet is over-dried or under-dried, an erroneous measurement may result.

SUMMARY OF THE INVENTION

In a preferred embodiment of the invention one or more belaching stages are controlled by means of an optical sensor which measures and records the whiteness or brightness of the fibers after they are bleached, washed, and matted. The amount of bleaching chemicals is automatically increased or decreased, as the case may be, depending on the value of the optical measurement in relation to a predetermined desired whiteness or brightness value.

The system has built in calibration standards of two different brightness levels so that the optical sensor may be calibrated over a range of brightness values. Means are provided to carry out this calibration automatically.

Thus one of the objects of the instant invention is to provide improved apparatus for measuring and controlling color.

A further object is to provide such apparatus for measuring and controlling the brightness of pulp stock in papermaking.

A still further object is to provide such apparatus which will be continuous.

Another object is to provide a brightness measuring and controlling apparatus which can be easily calibrated either automatically or manually.

These and other objects will be more apparent from the following description and the attached drawings.

BRIEF DESCRIPTION OF THE DRAWINGS

FIG. 3 is a view, partly in section, taken along the line 3—3 of FIG. 2 and diagrammatically showing the electrical controls of one of the measuring apparatus.

DESCRIPTION OF CERTAIN PREFERRED EMBODIMENTS

Figure 1:
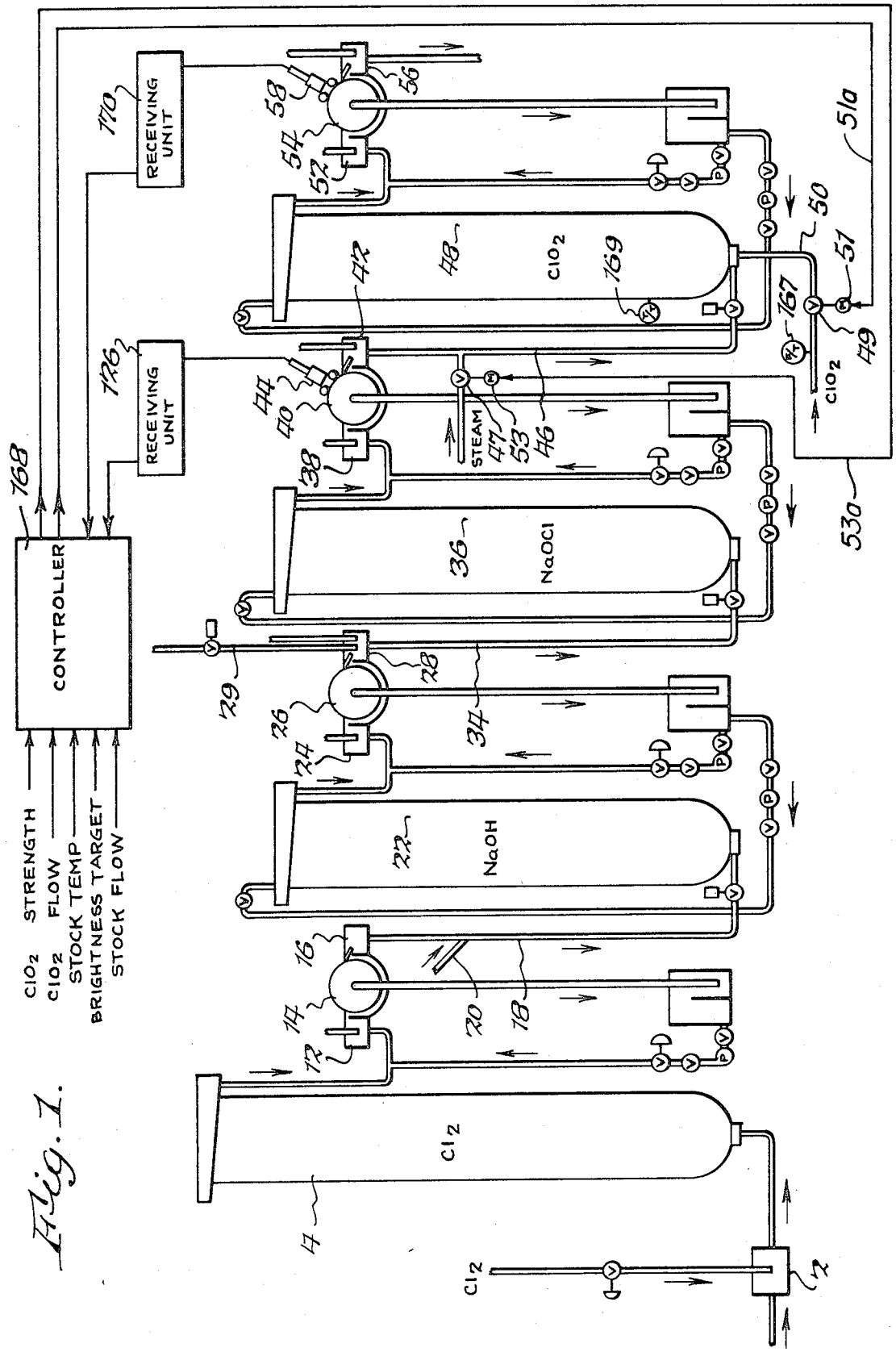
FIG. 1 is a flow diagram of a paper fiber bleaching plant incorporating the apparatus of the instant invention.

Referring now to FIG. 1, the fibers to be treated are mixed or blended with water in a blending chest, not shown, and are pumped, through mixer 2, into the bottom of tank 4. Chlorine is added to, and mixed with, the fiber slurry in mixer 2.

Tank 4, as are the other treatment tanks discussed later, is open at its top. Thus, the slurry overflows from the top of tank 4 and is discharged into box or chest 12 of a vacuum forming drum 14. The fibers are matted on drum 14 from chest 12, are water sprayed and washed as drum 14 rotates, and the washed, matted fibers are discharged from drum 14 into box or chest 16. The fibers are withdrawn from chest 16 through line 18.

Sodium hydroxide is fed into line 18 through line 20 and is fed with the fibers into the bottom of tank 22. The fibers overflow from the top of tank 22 and are discharged into box or chest 24 of vacuum forming drum 26. The fibers are again vacuum formed into a mat on drum 26, are water sprayed and washed and are discharged into box or chest 28. Sodium hypochlorite and sodium chloride are added to the fibers in chest 28 through bleach feed line 29 and the fibers are withdrawn from chest 28 and fed through feed means or line 34 into the bottom of tank 36.

The fiber slurry moves upward through bleach tank 36 and overflows the top of the tank into box or chest 38 of vacuum drum 40. The fibers are again vacuum formed into a mat on drum 40, are water sprayed and washed and are discharged from drum 40 into box or chest 52. As the fiber mat is rotated on drum 40 from chest 38 to chest 42, and after the mat is water sprayed and washed, the mat passes under a photoelectric measuring apparatus or head, generally designated 44. The photoelectric measuring head and its operation will be described in greater detail hereinafter.

From chest 42, the fibers are discharged through line 46 into the bottom of tank 48. The fiber slurry moves upward through tank 48 and overflows the top of the tank into box or chest 52 of vacuum drum 54. The concentration of chlorine dioxide within tank 48 is controlled by regulating additions of chlorine dioxide to the fiber slurry through motorized valve 49 and line 50 as the fiber slurry enters the bottom of tank 48.

The fibers leaving tank 48 are formed into a mat on vacuum drum 54. The mat is water sprayed and the washed fibers are discharged into box or chest 56. After the mat is water sprayed and washed and before the matted fibers are discharged from the drum, the mat passes under a second photoelectric measuring apparatus or head generally designated 58.

With the exception of photoelectric measuring heads 44, 58 and motorized valves 49, the foregoing arrangement is illustrative of a line bleaching plant and the process of the plant in which the apparatus of the instant invention to be described hereinafter is useful and may be incorporated. It is to be understood that the instant apparatus is useful and may be incorporated in other arrangements.

The apparatus of the instant invention measures and records the brightness, or whiteness, of the matted fiber both before tower 48 and afterward. As the brightness or whiteness varies, it regulates the flow of bleaching chemicals through a computer 168 to maintain the brightness or whiteness at the required level. The span of the output signal and the zero adjustment of the output signal are both adjusted and calibrated before operation so that the measuring apparatus will measure, record and regulate brightness at the desired level as will be described in further detail below. Thus, should be brightness of the fiber mat on drum 48, drum 54, or both exceed the desired level, computer 168 will adjust valve 49 so that the flow of bleaching agents to the system is decreased. Conversely, should the brightness fall below the desired level, computer 168 will adjust valve 49 so that the flow of bleaching agents is increased.

Figure 2:
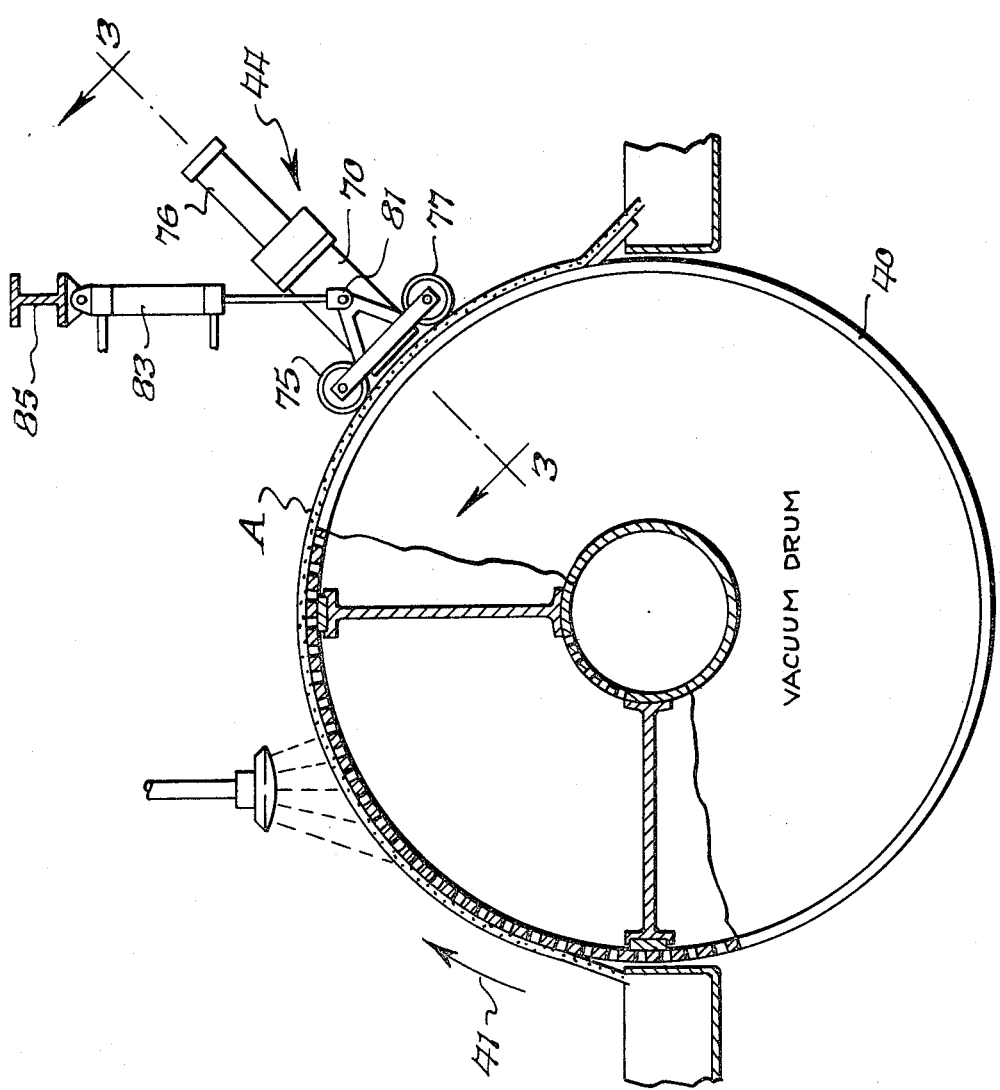
FIG. 2 is a side elevational view, partly in section, of the measuring apparatus of the instant invention.

Referring now to FIGS. 2 and 3, the photoelectric measuring heads will be described in detail. The measuring head 44 is supported by rollers on the fiber mat formed on vacuum drum 40. The second photoelectric measuring head 58 is supported by rollers on the fiber mat formed on vacuum drum 54. It is to be understood throughout the remainder of this description that measuring heads 44 and 58 and their supporting structures are of substantially identical construction. In other embodiments, however, the measuring heads may be of construction different from each other.

In FIGS. 2 and 3, photoelectric measuring head 44 includes a housing 70 of fiber glass, or lightweight metal such as aluminum, or other suitable material, supported by rollers 75, 77, rotatably mounted on frame 79, 79′, fixed to housing 70. Head 44 is held in position by air cylinders 83, 83′, each pivotally connected at one end at 81, 81′ to housing 70, and at their opposite ends to stationary beam 85. By actuating cylinders 83, 83′ the entire head 44 may be lifted from the surface of drum 40 during periods of start up and shut down of the washer.

Housing 70 is open at its bottom. At either side of the top it has upwardly and outwardly extending legs 72, 74 and upwardly extending leg 76 at its center. To keep out extraneous light and dust and to allow easy access to the interior of the housing 70, legs 72, 74, 76 each have covers 78, 80, 82, respectively.

Flood lamp 84, preferably a 150 watt lamp is mounted in socket 86 in leg 72. Flood lamp 90, preferably also a 150 watt lamp, is mounted in socket 92 in leg 74. Both flood lamps are powered by constant voltage transformer 88. The transformer 88 is powered by an external 115 v. A.C. source not shown.

The upper end of leg 76 of housing 70 is closed by wall 100 which, with the exception of aperture 102 in wall 100, forms a light-tight seal adjacent the upper end of the leg 76. A blue filter 104, for example a 457 millimicron filter, is positioned over aperture 102. A phototube 106 responsive to light passed by filter 104, is positioned in leg 76 intermediate wall 100 and cap 82, in alignment with aperture 102 and filter 104. The inner wall of leg 76, wall 100 and the inner side of cap 82 are preferably non-light reflective. They could be coated with a non-reflective and light-absorbing paint for example. The remaining inner walls of housing 70, including the inner walls of legs 72, 74, are light reflective.

The phototube 106 is connected in series with a load resistor 108 between the positive (+) and common (C) terminals of a 15 volt D.C., regulated power supply 110. One lead of the phototube is connected to the positive (+) terminal of supply 110 and one lead of resistor 108 is connected to the common (C) terminal of supply 110. The other lead of phototube 106 and the other lead of resistor 108 are connected together and to one lead of a resistor 112. The other lead of resistor 112 is connected to the positive (+) input terminal of a voltage amplifier 114.

Amplifier 114 is powered by a 26 volt D.C., regulated power supply 116. Also connected to the positive input terminal of amplifier 114 is one lead of a capacitor 118. The other lead of the capacitor is connected to one lead of a resistor 120 and to the common terminal (C) of power supply 116. The other lead of resistor 120 is connected to the negative (−) input terminal of amplifier 114. A feedback resistor 122 is connected between the output lead 124 of amplifier 114 and the negative input terminal of amplifier 114.

The output lead 124 is a shielded cable which connects the photoelectric measuring head 44 to a receiving unit designated generally as 126. The shield is connected to the comomn terminal of supply 116. Because the signal from the phototube 106 is amplified before leaving the head 44, the receiving unit 126 may be remotely located at least one hundred and preferably several hundred feet away. As will be explained in further detail below, variations of voltage on lead 124 cause receiving unit 126 to direct computer 168 to make appropriate changes in the position of motorized control valve 49 and thereby regulate the flow of bleaching agent to tank 48.

With the measuring apparatus 44 adjusted and the vacuum drum rotating in the direction of arrow 41 in FIG. 2, housing 70 is supported by rollers 75, 77 on fiber mat A of rotating vacuum drum 40. The end of housing 70 is open to the mat passing under rollers 75, 77 and is kept a fixed distance from the surface of mat A. Rollers 75, 77 are preferably rubber coated so that the mat fibers are not picked up by the roller surfaces.

As vacuum formed on drum 40, the surface of mat A may be relatively rough. Although roller 75, in rolling on the mat surface, need not flatten the mat surface, it does tend to flatten the more pronounced protuberances and fill the more pronounced valleys. The surface of the mat, as it moves under the open end of housing 70, reflects the light of lamps 84, 90 to phototube 106 through filter 104.

So long as the brightness of the mat passing under the open end of housing 70 remains the same the amount of light reflected by the surface of mat A to phototube 106 and the voltage developed across load resistor 108 will remain constant. This voltage is amplified by amplifier 114 and transmitted to receiving unit 126. If the brightness of mat A changes, however, the amount of light reflected by the surface of mat A to phototube 106 and the output voltage of receiving unit 126 will likewise change.

Referring now more particularly to FIG. 3, the operation of receiving unit 126 will be described in detail. Photoelectric head output lead 124 is connected through resistor 128 to the positive (+) input terminal of voltage amplifier 130. Amplifier 130 receives power from the positive (+) and negative (−) terminals of supply 116. A motor operated variable resistor 132 is connected between the negative (−) input terminal of amplifier 130 and the common terminal of supply 116. The gain or span of receiving unit 126 is adjusted by varying the position of the wiper arm of resistor 132 under the control of computer 168.

The output of amplifier 130 is connected to one lead of a brightness indicator 134. The other lead of brightness indicator 134 is connected to one lead of an output resistor 136 and a first output terminal 138. The other lead of output resistor 136 is connected to a second output terminal 140 and the negative input of amplifier 130. The voltage developed between terminals 138 and 140 is representative of the measured brightness of pulp mat A and is transmitted to a first input of computer 168. It may also be recorded.

A pair of normally closed relay contacts 142 are connected between the common terminal of supply 116 and the contact arm of response selector switch 144. A plurality of capacitors having different values, designated generally as 146, are each connected between separate contacts of switch 144 and the positive input terminal of amplifier 130. Although in the embodiment depicted in FIG. 3 only four capacitors are shown it is to be understood that other embodiments employ more or less than four capacitors.

As the contact arm of switch 144 is rotated from the extreme left-hand position (when it is connected directly to the positive (+) input of amplifier 130) to the extreme right-hand position, as viewed in FIG. 3, the response time of receiving unit 126 to signals on lead 124 is varied from substantially instantaneous response to 10 seconds, 30 seconds, one minute and two minutes, as the contact arm makes the first, second, third, fourth and fifth contacts of switch 144, respectively. If mat A is expected to be relatively smooth and of uniform color a short response time is selected for greatest accuracy. Where the mat is lumpy or of non-uniform color or brightness a longer response time is selected in order to operate the whole system more smoothly and accurately. During calibration of the system, to be described in greater detail hereinafter, the relay contacts 142 are opened under the control of the computer 168 to permit substantially instantaneous response.

A motor operated potentiometer 148 having non-adjustable end values is connected between the positive and negative terminals of supply 110. The wiper arm 150 of potentiometer 148 is connected to the common terminal of supply 116. By adjusting the position of wiper arm 150 the bias to the positive input of amplifier 114 (through phototube 106 and resistor 108) in relation to the common terminal of supply 116 (which is the circuit ground of receiving unit 126) is varied. This has the effect of elevating or suppressing the zero point of receiving unit 126.

Both span adjustment and zero adjustment may be carried out automatically by computer 168 or other controlling devices, not shown, as part of the calibration procedure to be described below. They may also be set manually during calibration.

In operation computer 168 is programmed to compare the pulp brightness measured by photoelectric measuring head 44, as represented by the voltage output at terminals 138, 140 of receiving unit 126, with a predetermined value representative of the desired brightness value of pulp leaving bleaching tower 48 and to calculate the difference, hereinafter referred to as delta $B_1$. The computer program takes account, either by manual settings of its controls or by sensor inputs, of the temperature of the pulp slurry flowing through tank 48 (through sensor 169 for example), its rate of flow, and the chemical strength of the bleaching agent ($ClO_2$) (indicated by sensor 167) to be added through valve 49 and formulates a constant gain factor, K.

On the basis of the product of factor K multiplied by delta $B_1$, computer 168 is programmed to generate a correction signal which operates motorized valve 49 to admit the appropriate amounts of bleaching agent ($ClO_2$) or to change the temperature of the unbleached stock by additions of steam to feed line 46 through motorized valve 47 so that the stock leaving tower 48 will have the desired brightness value. Since the bleaching process is a non-linear, highly dynamic system affected by many possible disturbances, the accuracy of factor K is continually checked by photoelectric measuring head 58.

Photoelectric measuring head 58 is coupled to receiving unit 170. Receiving unit 170 is substantially identical in construction to receiving unit 126. The voltage output signal from receiving unit 170, which is representative of the pulp brightness observed by photoelectric measuring head 58, is fed to a second input channel to computer 168.

Computer 168 is programmed to compare the brightness value observed by photoelectric measuring head 58 with the predetermined desired brightness value and to calculate the difference, hereinafter referred to as delta $B_2$. Taking into account that there is a time delay of approximately two hours between changes made at valve 49 and the results of those changes as observed by photoelectric measuring head 58, the computer modifies factor K in such a manner that under steady state conditions delta $B_2$ will be reduced to zero and the pulp leaving tower 48 will be at the desired brightness.

Valves 49 and 47 are operated by stepper motors 51 and 53, respectively. These motors are connected to respective lines 51a and 53a which lead to the computer 168 and serve to modify the degree of response of the motors and the attendant feed valves 47 and 49 to the control signal from the computer in accordance with the correction signal represented by delta $B_2$. The motors rotate a predetermined amount with each pulse received from computer 168 and in a direction determined by the polarity of the pulses. For example, computer 168 controls the rate of flow of chlorine dioxide through valve 49 by the number and polarity of electrical pulses which it delivers to valve motor 51. In other embodiments the valve motor's shaft position is a function of the duration and polarity of the electrical signal delivered from the computer and its associated control apparatus such as switching relays.

From time to time it is desirable to calibrate the system. For this purpose a low brightness standardization plate 152 and its pneumatic actuator 154 are used in conjunction with a high brightness standardization plate 156 and its pneumatic actuator 158 (see FIG. 3). The plates 152 and 156 have different reflectivities which define the desired span or range of brightness values. Low brightness plate 152 is connected to its pneumatic actuator 154 by means of chain and sprocket drive 160 and high brightness plate 156 is connected to its pneumatic actuator 158 by means of chain and sprocket drive 162. Air from an external source (not shown) is supplied to low brightness actuator 154 through solenoid valve 164 and to high brightness actuator 158 through solenoid valve 166.

Engaging solenoid valve 164 causes low brightness plate 152 to be lowered into the opening in housing 70 over pulp mat A under measuring head 44. Likewise, engaging solenoid valve 166 causes high brightness plate 156 to be lowered into the opening over pulp mat A under measuring head 44. In its lowered position each plate reflects the light from the lamps 84 and 90 to the phototube 106. Disengagement of either of the aforementioned solenoid valves causes its associated standardization plate to be lifted into its normal or non-calibrate position flush against the interior wall of measuring head 44.

Once initial calibration is established by means of correlation with lab tests, the zero point is checked by lowering low brightness plate 152 and noting the reading. The span or range of brightness values is checked by successively lowering low brightness plate 152 and high brightness plate 156 and noting the difference between the two readings. These checks may be made automatically or manually.

Periodic automatic checks of meter calibration are possible when the brightness meter is under computer control. The computer 168 is programmed to periodically lower the low brightness plate 152 and the high brightness plate 156 by activating the solenoid valves 164 and 166, respectively. Actual zero and span are then determined by computer 18 from readings taken at terminals 138, 140 of receiving unit 126. If the actual zero and span do not agree with programmed or targeted zero and span, the computer adjusts the zero point to the programmed value by activating motorized potentiometer 148. Likewise, the span may be adjusted to the programmed value by computer activation of motorized variable resistor 132. Thus, calibration is maintained automatically.

Computer 168 may be of either the digital or analogue type and it includes appropriate built in analogue to digital or digital to analogue signal converters for its input and output channels.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for continuously controlling the bleaching of fibers comprising, a first revolving drum, means for forming a first mat of the fibers to be bleached onto the first drum, first photoelectric measuring means for producing a first control signal representative of the brightness of the first mat of fibers, a bleaching tank, means for feeding unbleached fibers from the first drum to the bleaching tank, means responsive to the first control signal for feeding bleaching agent to the tank, a second revolving drum, means for discharging bleached fibers from the tank and for forming them into a second mat on the second drum, a second photoelectric measuring means for producing a second control signal representative of the brightness of the second mat of fibers, means for comparing the value of the second control signal to a predetermined brightness value and for generating a correction signal representative of the relationship therebetween, and means responsive to the correction signal for modifying the degree of response of the bleaching agent feed means to the first control signal.

2. Apparatus as recited in claim 1 wherein at least one of the first or the second photoelectric measuring means further comprises means for calibrating the corresponding control signal, the calibrating means including a first light reflective standard and a second light reflective standard and means for sequentially positioning the first and the second standards to reflect light to the corresponding photoelectric measuring means.

3. Apparatus as recited in claim 2 wherein the first standard and the second standard have different reflectivities which define a predetermined range of brightness values.

4. Apparatus as recited in claim 1 further comprising means responsive to the first control signal for controlling the temperature of the unbleached fibers entering the bleaching tank.

5. Apparatus for continuously controlling the bleaching of fibers comprising, a first revolving drum, means for forming a first mat of the fibers to be bleached onto the first drum, first photoelectric measuring means for producing a first control signal representative of the brightness of the first fiber mat, the first photoelectric measuring means including a first housing open at one end, first roller means for supporting the first housing on the first mat with the open end of the first housing facing the first mat, a first light source, first light responsive phototube means in the first housing for producing a first output signal in response to the intensity of light reflected from the first mat to the first phototube means, and first receiving means responsive to the first output signal for generating the first control signal, a bleaching tank, means for feeding fibers from the first drum to the tank, means responsive to the first control signal for feeding bleaching agent to the tank, a second revolving drum, means for discharging bleached fibers from the tank onto a second mat on the second drum, second photoelectric measuring means for producing a second control signal representative of the brightness of the second fiber mat, the second photoelectric measuring means including a second housing open at one end, second roller means for supporting the second housing on the second mat with the open end of the second housing facing the second mat, a second light source, second light responsive phototube means in the second housing for producing a second output signal in response to the intensity of light reflected from the second mat to the second phototube means, and second receiving means responsive to the second output signal for generating the second control signal, means for comparing the magnitude of the second control signal with a predetermined magnitude representative of a desired standard pulp brightness, and means responsive to the comparing means for modifying the degree of response of the bleaching agent feed means to the first control signal.

6. Apparatus as recited in claim 5 wherein at least one of the first or second receiving means is located at least one hundred feet away from the first or second phototube means.

7. Apparatus as recited in claim 5 wherein at least one of the first or second phototube means comprises a phototube having an electrical output and means for amplifying the phototube output.

8. Apparatus for continuously controlling the additive injection of a bleaching agent into a continuously moving stream of fibrous material comprising, a bleaching tank, means for feeding bleaching agent into the tank, a drum, means for forming the fibrous material into a mat on the drum prior to bleaching, photoelectric measuring means for producing an electrical control signal representative of the brightness of the mat, the photoelectric measuring means including a housing open at one end, roller means for supporting the housing on the mat with the open end of the housing facing the mat, a light source, a light responsive phototube in the housing for producing a signal in response to the intensity of light reflected from the mat at the open end of the housing to the phototube, means within the housing for calibrating the control signal including a first light reflective standard and a second light reflective standard, means for movably mounting the first and the second standards on the housing, means for alternatively and sequentially moving the first and the second standards into the open end of the housing such that light from the light source is reflected from each of the first and the second standards in sequence to the light responsive phototube, and means responsive to the control signal for controlling the means for feeding bleaching agent to the tank.

9. Apparatus as recited in claim 8 including a bandpass light filter intermediate the light source and the phototube.

References Cited

UNITED STATES PATENTS

| | | | |
|---|---|---|---|
| 2,882,785 | 4/1959 | Biesele | 356—212 X |
| 3,197,644 | 7/1965 | Etzrodt et al. | 250—218 |
| 3,465,550 | 9/1969 | Strom et al. | 162—17 X |
| 3,216,241 | 11/1965 | Hansen | 73—75 |
| 3,586,601 | 6/1971 | Persik et al. | 162—252 |
| 3,486,971 | 12/1969 | Weyrick | 162—252 X |

OTHER REFERENCES

Obenshain: "Black Widow Bleeching Control System" in TAPPI, vol. 41, No. 1, January 1958, pp. 1–9.

S. LEON BASHORE, Primary Examiner

R. H. TUSHIN, Assistant Examiner

U.S. Cl. X.R.

162—49, 238, 263; 250—219 WE, 219 FR; 356—212